July 18, 1933.  D. I. REITER  1,919,038
UPHOLSTERY PIN
Filed June 29, 1932
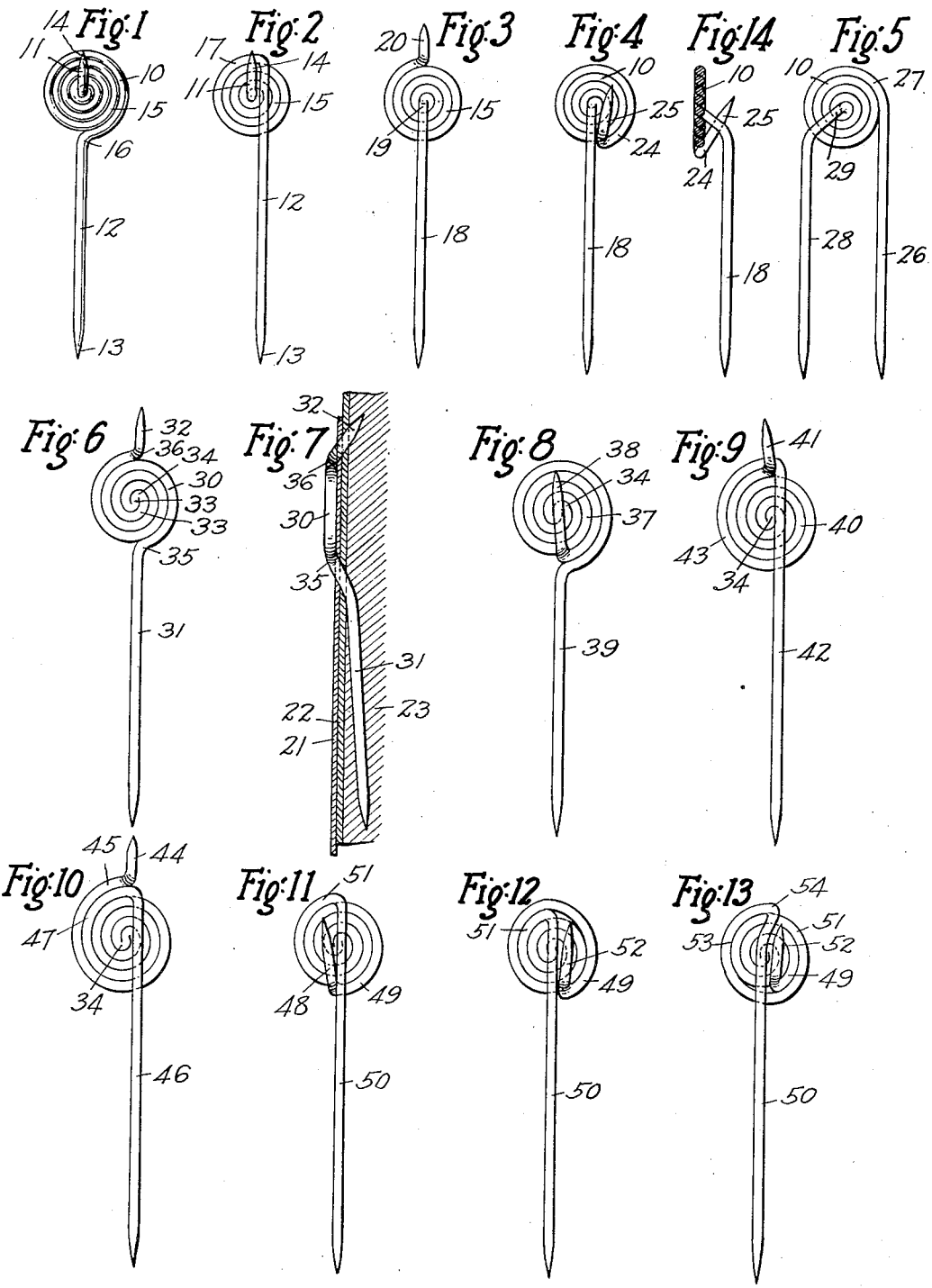
INVENTOR
Daniel I. Reiter
BY
Harry Jacobson
ATTORNEY Patented July 18, 1933

1,919,038

UNITED STATES PATENT OFFICE

DANIEL I. REITER, OF NEW YORK, N. Y.

UPHOLSTERY PIN

Application filed June 29, 1932. Serial No. 619,892.

This invention relates to headed pin fasteners and particularly, to that type designed to secure the fabric slip covers for automobiles in place, and provided with means for preventing accidental retraction of the pin after once it has been inserted in place.

My invention contemplates the provision of a pin adapted to have all the parts thereof including the head made from a single integral length of wire and in which a main pin and a secondary pin are provided, the main and secondary pins being adapted to be arranged at any desired angle and at any desired distance or relation to the head of pin.

My invention further contemplates the provision of a movable or yieldable pin head adapted to be locked in place by a projecting spur integral with the head.

The various objects of my invention will be clear from the description which follows, and from the drawing, in which, Fig. 1 is an elevational view of my improved pin showing the integral head, main and secondary pins.

Fig. 2 is a similar view of the same, modified, however, from Fig. 1 in that the main pin extends from the top of the head instead of from the bottom.

Figs. 3, 4 and 5 are similar views of modified forms of my improved pin showing other arrangements of the main and secondary pins emerging from various different points of the head.

Fig. 6 is a similar view of a modified form of the pin wherein the head is formed after the length of wire from which the pin is made, has first been folded on itself.

Fig. 7 is a side view of the same, partly in section, showing the pin as it appears applied to an upholstered body for securing a slip cover to the body.

Figs. 8, 9, 10, 11, 12 and 13 are elevational views of modified forms of the pin shown in Fig. 6, illustrating various arrangements of the main and secondary pins with respect to the head.

Fig. 14 is a vertical section and side view of the pin shown in Fig. 4, showing the bend at the upper end of the main pin, and the rearward disposition of the secondary pin.

In that practical embodiment of my invention which I have illustrated by way of example, and referring particularly to Fig. 1, the entire pin, including the head 10, the secondary pin or locking element 11 and the main pin 12 are all made by bending the parts mentioned from a single integral length of wire pointed at its ends as 13 and 14. I prefer to form the head by first bending the secondary pin 11 from one end of the length of wire in the proper direction so as to stand out from the head 10 in the desired direction and for the proper distance, and then to convolute the succeeding part of the wire through a plurality of contacting turns or convolutions 15 to form the head. The other end or terminal portion of the length of wire may then be bent as at 16 downwardly and rearwardly to direct the pin 12 in the desired direction, it being understood, however, that the main pin 12 may first be bent from the length of wire before the intermediate portion of the length is convoluted.

It will also be understood that while the main pin 12 is shown disposed radially of the head, it may be arranged in a direction other than radial as shown, for example, in Fig. 10, and that the center line of the main pin need not necessarily pass through the center of the head. It will further be understood that while I have shown circular convolutions on the head 10, said convolutions may take other shapes such as square, elliptical, polygonal or the like, as may be found convenient or desireable, and as will be obvious without further illustration.

In any case, however, the convolutions 15 are preferably unsecured to each other so that the head is yieldable to a certain extent by the separation of the convolutions laterally under pressure put upon it or upon the main or secondary pins.

Referring now to Fig. 2, I have there shown a pin identical with that shown in Fig. 1 excepting that the last convolution or turn 17 is brought to the upper part of the head and past the secondary pin 11 so that the main pin 12 extends completely across the head. This form of my improved pin has the advantage of gripping the fabric between the secondary pin 11 and the last part of the last turn 17 and thereby aids in maintaining the pin in place.

In Fig. 3, I have illustrated a form of my new pin wherein the main pin 18 emerges from the center of the head 10, the bend 19 directing the main pin rearwardly and downwardly. The secondary pin 20, however, is formed from the other end of the length of wire and as illustrated, projects upwardly and rearwardly.

It will be understood that in those forms of my new pin heretofore described as well as those shown in Figs. 4 to 13 inclusive, the pin fastener is arranged in place by first passing the main pin through the slip cover 21 (Fig. 7) and through the upholstery cover 22 and either into the upholstery stuffing 23 or if the upholstery stuffing is omitted, against the sheet metal backing usually provided underneath the cover 22 in automobiles or the like. After the main pin has been pushed down as far as it will go, that is, until stopped by the head, the main pin is partly withdrawn and pressure brought to bear on the secondary pin until said secondary pin passes through the covers 21 and 22 and into the upholstery stuffing 23 where such upholstery is provided, in a manner well known in the art.

As illustrated in Fig. 4, the main pin 18 is arranged similarly to the corresponding main pin of Fig. 3 but the last turn 24 of the head is carried to a point adjacent the main pin before the secondary pin 25 is bent therefrom. In this form of my pin fastener, the secondary pin 25 is arranged behind the head 10 instead of projecting therefrom and has the advantage of protecting the fingers of the users against the point of the secondary pin. At the same time, the main pin 18 may be pushed into the material up to the center of the head 10 whereafter partial retraction of the pin fastener forces the secondary pin into the fabric to prevent accidental withdrawal of the pin fastener from the fabric.

As shown in Fig. 5, the main pin 26 is tangent to the last convolution 27 of the head 10 while the secondary pin 28 is elongated and arranged parallel to the main pin 26, the upper end 29 of the secondary pin emerging from the center of the head. The convolutions of the head, however, may be made in the same manner as hereinbefore described in connection with Fig. 1. In this form of my invention, the secondary pin 28 forms the locking member, cooperating with the main pin 26 to maintain the pin fastener in place.

Referring to Fig. 6, I have there shown a form of my invention requiring somewhat less labor in the formation of the head 30. As there shown, the length of wire is first folded on itself through an angle of 180° to bring the two parts thereof adjacent to each other though it will be understood that the part from which the main pin 31 is formed is longer than the part from which the secondary pin 32 is formed. Two convolutions 33 are formed simultaneously when the thus double length of wire is bent through a complete turn or 180°. The end bend 34 of the folded length is preferably arranged in the center of the head 30, the ends of the length being separated as shown, to form the main and secondary pins. Said pins are arranged with their center lines in the desired angular relation, being bent rearwardly to a slight extent as at 35 and 36 (Fig. 7).

Similarly, in Fig. 8, the bend 34 is also arranged at the center of the head 37 but both ends of the length of wire are brought around to the same point of the head before the ends are bent to form the secondary pin 38 and the main pin 39.

As shown in Fig. 9, the bend 34 is also arranged at the center of the head 40 and both ends of the length of wire are again brought around to the same point on the head as in the form shown in Fig. 8 but this point, instead of being arranged at the bottom of the head, is at the top of the head. The secondary pin 41 being bent upwardly, projects upwardly beyond the head while the main pin 42 projects downwardly and crosses the head. It will be noted that in this form of my invention, the secondary pin 41 crosses the outermost convolution 43 of the head, from which convolution is bent the main pin.

As shown in Fig. 10, however, the secondary pin 44 is bent from the outermost convolution 45 of the head while the main pin 46 is bent from the next adjacent convolution 47.

In this modification, I have further shown the main pin arranged to the right of the fold 34 though it will be understood that said main pin may be arranged in other positions such as to the left of said main fold, if desired, and as will be obvious without further illustration. Similarly, the secondary pin may be bent at any desired angle and out of alignment with the center of the head, if desired or if found convenient.

In that form of my invention shown in Fig. 11, the secondary pin 48 is bent from the outermost convolution 49 and extends upwardly from the bottom of the head while the main pin 50 is bent from the convolution 51 at the top of the head.

The modification in Fig. 12 differs from that shown in Fig. 11 in that the last convolution 49 is extended around and outwardly of the convolution 51 to a point adjacent the main pin 50 and the secondary pin 52 is bent from the end of said convolution 49 at a point on the right of the main pin.

As shown in Fig. 13, the convolution 51, instead of terminating at the top of the pin, is carried around the head for another turn 53 to the point 54 before the main pin 50 is bent therefrom. This causes the secondary pin 52 to emerge from the head from a point spaced inwardly of the periphery of the head and thereby imparts an additional spring action to the secondary pin.

In all of the various forms of my new pin hereinbefore described, however, it will be noted that all of the parts may be formed from a single integral length of wire pointed at the ends and that the head is preferably formed by making a series of turns or convolutions in that portion of the length of wire intermediate the ends thereof.

In any case, the head is thereby made yieldable or resilient to a sufficient extent to tend to return the parts to their original positions after said parts have been slightly moved from said positions as when having been inserted in the proper manner in their operative positions in engagement with a piece or pieces of fabric.

It will be seen that in the forms of my invention described, the pin fasteners disclosed are adapted for economical production with ease and rapidity in large quantities and are efficient for the purposes for which they are intended.

While I have shown and described certain specific embodiments of my invention, I do not wish to be understood as limiting myself thereto since I intend to claim my invention as broadly as may be permitted by the state of the prior art and the scope of the appended claims.

I claim:

1. A pin fastener of a single integral length of wire pointed at both ends thereof, comprising a substantially straight main pin portion of said length bent in one direction, a secondary pin portion of said length bent in another direction, and a plurality of coplanar concentric convolutions forming a closed head bent from the intermediate portion of said length.

2. In a pin fastener of a single integral length of wire, a main pin at one end of said length, a secondary pin at the other end of said length, and an integral head closed from its center to its periphery consisting of a plurality of turns in the intermediate portion of said length.

3. A pin fastener of a single integral length of wire, including a head closed from its center to its periphery and convoluted in contacting convolutions from an intermediate portion of the length of wire, and opposed pin portions at the extremities of the length of wire.

4. In a pin fastener of a single integral lengt of wire, a head bent from an intermediate portion of the length in a plurality of contacting convolutions extending to the center of the head, and pin means bent from and integral with the head.

5. A pin fastener comprising a head consisting of a plurality of coplanar concentric turns of a single integral length of wire, one end of said length terminating in a spur, and the other end of said length being bent rearwardly away from the head and terminating in an elongated straight pin shank.

6. In a pin fastener of a single integral length of wire, a closed head completely filled with a plurality of adjacent turns convoluted from an intermediate portion of the length, and a pair of pin portions each bent from a terminal portion of the length.

7. In a pin fastener of a single integral length of wire, a head comprising a plurality of convolutions bent from an intermediate portion of the length and lying substantially in the same plane, a substantially straight elongated main pin portion bent from one extremity of the head, and a second pin portion bent from another extremity of the head and arranged angularly with respect to the head and to the main pin portion.

8. In a pin fastener of a single integral length of wire, a main pin portion bent rearwardly and downwardly from one end of the length, and having a substantially straight elongated shank, a secondary shorter pin portion bent from the other end of the length and substantially in the opposite direction to that of said main pin portion and an integral resilient head comprising a plurality of convolutions joining said pin portions, said convolutions being laterally yieldable under stress applied laterally thereto, but being normally in contact with adjacent convolutions of either side.

9. The method of making a pin fastener comprising pointing the ends of a length of wire, convoluting an intermediate portion of said length through a plurality of turns, beginning at the center of a head to be formed by said convolutions to close the center of the head thus formed and bending the end portions of said length in substantially opposite directions.

10. The method of making a pin fastener including the step of forming a head therefor by convoluting an intermediate portion of a single length of wire through a plurality of turns, while arranging said turns in close contact with each other and concentrically to form a closed head and bending the remainder of the length at points immediately beyond the head thus formed while maintaining said remainder substantially straight.

11. The method of making a pin fastener of a single integral length of wire comprising folding the length on itself at a predetermined point to form a fold, using the fold thus formed as a center, bending a plurality of convolutions bent from that portion of the length extending from the fold and about the center, and bending straight pin portions from the ends of the length.

12. In a pin fastener of a single length of wire, a head comprising a plurality of convolutions bent from said length and arranged concentrically about a fold of the length, and a pair of oppositely extending pin portions on said length.

13. In a pin fastener of a single integral length of wire, a fold in said length, a plurality of convolutions bent about the fold as a center, a comparatively short pin bent from one end of the length in one direction and a longer pin portion bent from the other end of the length and in substantially the opposite direction.

14. In a pin fastener of a single length of wire, a head comprising a plurality of convolutions, and a pair of pins integral with the head, one of said pins projecting rearwardly from the center of the head and having its shank arranged in one direction, and the other projecting rearwardly from the outermost convolutions of the head and having its shank arranged in substantially the opposite direction.

DANIEL I. REITER.